Figure 1:
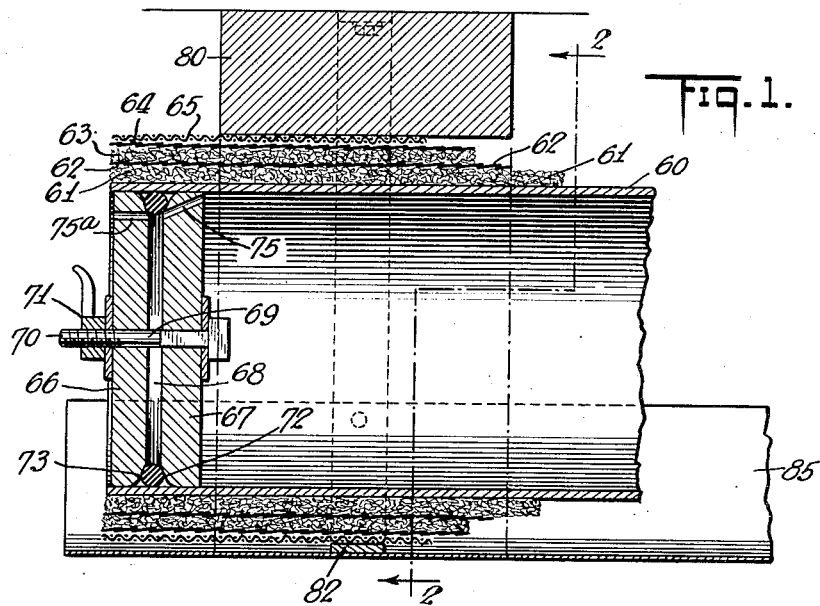

March 17, 1931.  T. B. SLATE  1,796,910

REFRIGERATING APPARATUS AND METHOD

Original Filed Sept. 27, 1924

INVENTOR
Thomas B. Slate
BY
George C. Olsen
ATTORNEY

Patented Mar. 17, 1931

1,796,910

UNITED STATES PATENT OFFICE

THOMAS B. SLATE, OF GLENDALE, CALIFORNIA, ASSIGNOR, BY MESNE ASSIGNMENTS, TO AMERICAN PATENTS DEVELOPMENT CORPORATION, OF NEW YORK, N. Y., A CORPORATION OF DELAWARE

REFRIGERATING APPARATUS AND METHOD

Original application filed September 27, 1924, Serial No. 740,162. Divided and this application filed February 10, 1931. Serial No. 514,854.

My present invention was disclosed in my prior application, Ser. No. 740,162, filed September 27, 1924, of which this case is a division. As explained in said prior application, the invention relates to refrigeration of the general type set forth in my copending application Ser. No. 685,482, filed January 10, 1924, now Patent No. 1,511,306, granted October 14th, 1924.

In said patent I have described and claimed various forms of refrigerators, each characterized by having solidified carbon dioxide enclosed within the refrigerator and discharging gaseous refrigerant in such a way that the gas affords insulation. When discharged into the refrigerated space, it prevents mold and excludes air from the materials that are refrigerated, and otherwise refrigerates and preserves the same.

My present invention includes certain of the general features above described, but relates more specifically to refrigerating chambers and to the container of solid carbon dioxide which is usually located in the upper part of the chamber and is adapted to be charged with frozen carbon dioxide which has been previously manufactured elsewhere. This container is gas-tight except that it has provision for high level escape of the gas. It results that when the container is charged with the frozen carbon dioxide, the heavy cold gas evolved therefrom displaces the air and drives it upward, so that the container becomes filled with pure, dry gas which protects the frozen carbon dioxide and greatly decreases its sublimation rate.

The claims of said application No. 740,162, of which this case is a division, have been limited to Figs. 1 to 4, which are Figs. 7 to 10 inclusive of Patent No. 1,511,306 and which show a chamber refrigerated by a single large container into which all of the frozen carbon dioxide is charged. The container is of insulating material and may be a balsa wood box. It is shown as cubical, thereby affording maximum capacity for minimum area of exterior heat absorption surface. The heat absorption and direct chilling of the atmosphere is localized at and upon this exterior surface, which thus becomes in effect a refrigerant source operating at predetermined moderate temperatures, notwithstanding the fact that it is activated from within by an intensely cold primary source—the solid carbon dioxide. The down-draft of the thus chilled atmosphere is correspondingly localized. The evolution of the gas and outpouring of the refrigerant gas is similarly localized.

Original Figs. 5 to 8 of Ser. No. 740,162 concern further improvement in distribution of the heat absorption area and many details of construction and operation of the complete system. The total refrigerant charge is subdivided among a plurality or any desired number of containers distributed throughout the refrigerated space, and each container is made long as compared with its diameter in order that its exterior heat absorbing area may have any desired ratio to the volume or quantity of solid which it will contain. This system is claimed in a companion divisional application of even date herewith.

Original Figs. 7 and 8 show certain important features of this container, particularly the use of metal as a means for distributing the refrigerant values to points remote from the region in which the frozen carbon dioxide absorbs heat collected by the metal and by it conducted into heat exchange relation with the solid. My present application is specific to the container, and while some of the more specific claims include the feature of elongation and the use of insulation, others are not so limited. That is to say, certain of the broader claims are independent of the shape, location or number of containers that may be used.

Figure 2:
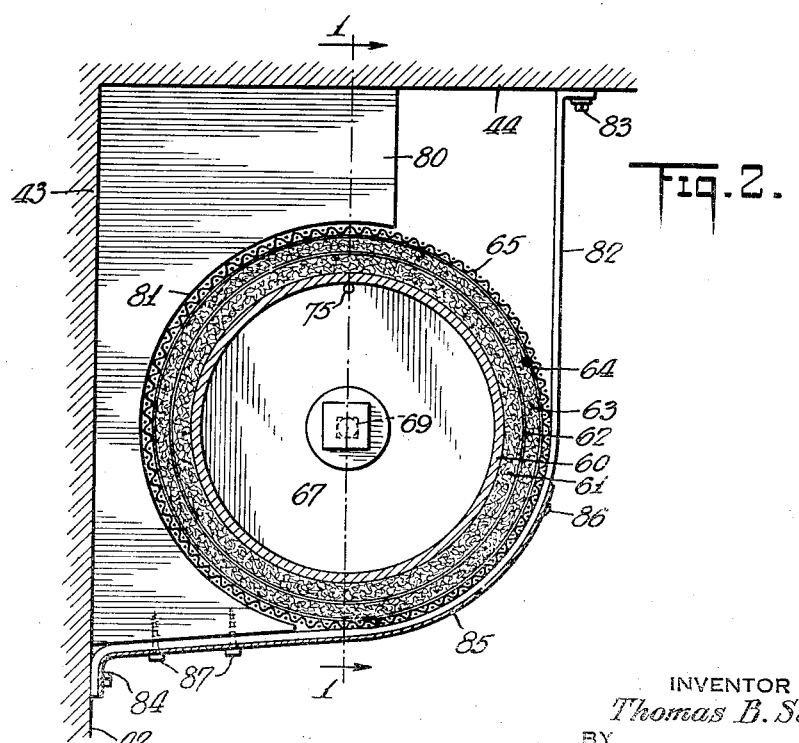

The above and other features of my invention may be more fully understood from the following description in connection with the accompanying drawings, in which Fig. 1 is a vertical longitudinal section of a container embodying my invention, the section being on the line 1—1, Fig. 2; and Fig. 2 is a vertical section on the line 2—2, Fig. 1.

A refrigerator chamber 43 of any desired type may be supplied with one or more containers like 52, preferably arranged along the upper corners between side walls and roof, and preferably discharging their refrigerant gas at the ends nearest the doors where it is apt to be warmer.

The container is preferably long and of small diameter as compared with its length, this being a structurally convenient means whereby the necessary large quantities of solid carbon dioxide may be stored and absorb heat within a relatively warm, high-level, horizontally-extensive region or stratum of the refrigerator atmosphere; but these features are even more important because they afford a large area horizontal support surface upon which the solid carbon dioxide melts down vertically with minimum change of length and minimum change of proximity to the surfaces through which the heat is absorbed.

In a special case, the containers were about 14 feet by 1 foot, and the upper surface of the container was arranged 7 or 8 inches below the roof and extended horizontally, so that the upper layer of warm air or gas will contact with greater or less area of the container according as said layer grows thicker or thinner by greater or less heat penetrating the roof or by warm air or gas forced up from below.

On the dimensions above given, and allowing, say, 4 inches for thickness of insulation, this container would have about one-tenth the capacity, but its exterior heat absorbing surface will be approximately the same as for a single 5-foot cube balsa wood box. The advantage is that the heat absorbing area is distributed horizontally, any desired distance. Consequently, all of the convection currents will be diffused, and tending to come from the nearest points below the container and to flow directly downward again.

The inner cylinder 60 may be of galvanized sheet iron, about $\frac{1}{16}$th inch thick, affording heat conduction sufficient to keep its entire area at reasonably constant temperature so long as there is any substantial amount of solid remaining in the container along the bottom thereof. Making the cylinder 60 of thicker iron or of aluminum would result in still greater uniformity with still less solid in the container. The container may be insulated in any desired way, to any desired extent. If desired, insulation may be used and this may consist of a layer 61 of commercial hair felt normally about 1 inch thick, but wrapped on and compressed by adhesive tape 62 to a thickness of about ½ inch. Over this is shown a second, similar layer of hair felt 63, held compressed by a second layer of adhesive tape 64, and the whole is covered with a layer of canvas or other carefully waterproofed fabric 65.

The cylinder may be slightly inclined so as to be self-draining when opened and emptied. The ends of the cylinder 60 may be closed, and heat insulated in any desired way, as by two similar closures, each consisting of a pair of discs 66, 67, preferably of balsa wood, each about 2 inches thick and chamfered as at 72 to afford recesses for an annular packing 72 about ⅝ inch to one inch in diameter, which is adapted to be wedged radially into air-tight frictional engagement with the cylinder 60, by forcing together the discs 66, 67, as by means of a central bolt 69 having a head engaging a washer and having a squared shank closely fitting a squared recess in the disc 67. The threaded portion 70 projects through the disc 66 and is provided with a lever nut 71, provided with a handle for rotating it. Thus held, the heads can be forced out without damage, in case of undue rise of internal pressure, as by freezing of gas outlet through passages 75, 75a. These passages may be say ⅛ to ⅜ inch in diameter, extending through the discs 66, 67, near the uppermost edges thereof and the inner vent 75 drains by overflow from the topmost level of the gas within the container. So long as the gas outlet is by high level overflow, the solid will be submerged in and protected by fresh relatively pure gas. Nevertheless, the vents have certain advantages, and they may be designed for any desired jet velocity for mechanical mixing in the atmosphere, and their lengths and flow resistances may be proportioned with respect to normal sublimation rate and resulting output of gas, so that in operation the flow will always be from the interior to the exterior, thereby completely preventing any inbreathing of air from the outside.

When there is an interspace 68 between the discs 66, 67, it is an added safeguard, since even if air and moisture diffuse, through the outer perforation 75a, it will be trapped in the interspace, instead of inside the container.

These containers may be securely held in the desired position as shown in Fig. 2, by providing a plurality of bearing blocks 80, each having a concave seat 81 for about one-half the cylinder circumference. The cylinder is securely held in contact with these seats and its weight partially supported by straps 82 secured to the ceiling 44 by suitable bolts 83 and to the side wall 42 by bolts 84.

As the exterior heat absorbing surface 65 may collect dew or frost, it is desirable to prevent drip upon the merchandise being transported as by providing a sheet metal shield or drip trough 85, which may be conveniently secured to the exterior of the straps 82 by rivets as at 86; and by securing bolts 84 and screws 87.

The outlets 75, 75a are preferably open from the highest points so as to take the lightest gas, particularly all air and moisture from the spaces vented by each, and they may be inclined so as to drain toward the exterior as shown. The interspace 68, being continuously supplied with cold fresh gas, is the best possible non-conducting protection for the interior of the container.

From the above, it will be evident that by making, or lining, the container with good conducting material such as steel or aluminum, a relatively small amount of intensely cold solid carbon dioxide, resting upon or otherwise maintained in constant heat absorbing relation to a relatively small area of the metal, will keep the metal and consequently interior of the container at a practically constant temperature, entirely around the circumference of the container and for a wide zone on either side of the solid. This does not mean that distant parts of the metal are maintained at precisely the same temperature as the spot on which the solid rests. There is some temperature gradient of course according to distance from the part of the metal nearest to the solid carbon dioxide but the temperature of all the metal is, for all practical purposes, almost the same so long as there is some substantial amount of solid carbon dioxide in close heat exchange relation with a substantial area of the metal. This heat collecting function exists whether or not heat insulating material is used. Where exterior heat insulation is used, as above described, it prevents direct or rapid cooling and, in the preferred case, the temperature drop of over 100° F. between the interior and exterior of the container is so great that refrigeration of the external air (heat absorption therefrom) remains near enough constant for all practical purposes so long as there is some substantial amount of solid carbon dioxide left along the bottom of the container. The practical limit will be the lowest where the solid carbon dioxide does not contain water ice or other non-melting impurities such as could operate to raise the melting point; or could form an irregular or variable layer of ice causing widely variable rate of heat absorption between the carbon dioxide and the metal; whereas any constant, regular insulation between the solid and the metal would merely lower the rate of heat transfer without making it irregular or unreliable. Obviously, the phenomenal heat collecting quality of the metal container is usable for distributing refrigerant values of the solid to remote points, regardless of how or whether insulation is used.

As all the absorbed heat goes into gas making without much change in temperature of the insulated metal lining, the lining itself becomes in effect a practically constant temperature source which does not change area during use as the frozen carbon dioxide necessarily does and hence the containers can be designed for any desired area, without any close reference to the amount of refrigerant contained therein. This affords great freedom in varying the amount of heat absorbing surface and thereby the rate of production of refrigerant values at any given temperature of the refrigerator.

It will be noted that increase of such area increases such rate and that the same effect is producible by decrease of insulation of the surface without changing its area, but in the latter case the result is produced by greater intensity of working of each unit area, instead of by having more units working at unchanged intensity.

I claim:

1. The method of refrigeration which consists in enclosing within a chamber with the material to be refrigerated, a quantity of suitably insulated solid carbon dioxide which on absorption of heat from the atmosphere within the chamber, passes directly from the solid to the gaseous state, and permitting gas thus formed to escape into the atmosphere of said chamber rendering the rates of said heat absorption practically independent of decrease in the amount of said solid by supporting the solid upon good conducting material, within and suitably protected by the insulation of the heat absorbing surfaces.

2. A refrigerator in combination with means therein for refrigerating it at moderate temperatures by means of solid carbon dioxide, said means including a metal container on the inner surface of which said solid rests, and an exterior insulating covering and a waterproof covering for the latter.

3. The method which includes refrigerating for predetermined moderate temperature ranges, under varying temperature conditions, during relatively long periods, by gradual evaporation from a correspondingly large initial supply of solid carbon dioxide, absorbing heat derived from the refrigerated atmosphere and discharging its resultant cold carbon dioxide gas into said atmosphere, and compensating for the diminishing heat absorbing surface of said solid supply, by applying said heat mainly through the surface of material which is a good conductor of heat, and maintaining continuous good contact of said solid with said surface.

4. The method which includes refrigerating for predetermined moderate temperature ranges, under varying temperature conditions, during relatively long periods, by gradual evaporation from a correspondingly large initial supply of solid carbon dioxide, absorbing heat derived from the refrigerated atmosphere and discharging its resultant cold carbon dioxide gas into said atmosphere, and compensating for the diminishing heat absorbing surface of said supply of solid carbon dioxide, by applying said heat mainly through the surface of material which is a good conductor of heat, and maintaining continuous good contact of said solid with said surface by gravity pressure of the solid thereon.

5. Refrigerating apparatus including a metal container exteriorly protected by heavy, permanent insulation and enclosing solid carbon dioxide, and adapted to permit escape of gas therefrom, and a removable closure to permit charging of the container with blocks of the solid.

6. Refrigerating apparatus, including a metal container, exteriorly protected by heavy, permanent insulation and enclosing solid carbon dioxide, and adapted to permit escape of gas by overflow from a high level portion thereof, and removable closure to permit charging of the container with blocks of solid carbon dioxide.

7. A container and solidified carbon dioxide within said container, said container being practically gas-tight except for a high level outlet; whereby heavy cold gas evolved from the solid operates to drive out the upper, warmer, less pure part of the atmosphere within the container, for the purpose and with the result that in continued operation the solid is completely submerged in the purest part of the gas, said container comprising a layer of metal and a layer of insulation.

8. A container and solidified carbon dioxide within said container, said container being practically gas-tight except for a high level outlet; whereby heavy cold gas evolved from the solid operates to drive out the upper, warmer, less pure part of the atmosphere within the container, for the purpose and with the result that in continued operation the solid is completely submerged in the purest part of the gas, said container comprising a layer of metal and a layer of insulation, the metal layer being innermost and having the solid resting thereon.

9. Refrigerating apparatus, including a relatively thin, large-area metallic element or plate, having one portion of its surface in heat absorbing relation to a region or material to be cooled and having solidified carbon dioxide in constant heat absorbing relation with another surface more remote from said heat-absorbing portion, the thickness of said material being predetermined to maintain approximately constant temperature for the more remote portions.

10. The method which includes refrigerating for moderate temperatures, by gradual evaporation of an initial supply of solidified carbon dioxide, by absorbing heat from the atmosphere or material to be refrigerated, at a level above said solid through a surface of a material which is a good conductor of heat, and applying it to said solid by maintaining constant heat absorbing relation of said solidified carbon dioxide with another, more remote, lower level surface of said material, the heat absorbing area of said conducting material being much greater than the area of constant heat absorption by said solid and the temperature of the remote portions of said material being rendered uniform within desired limits by predetermined thickness for said material.

11. The method of refrigerating by evaporation of solidified carbon dioxide, which includes absorbing heat from the refrigerated atmosphere or material through the surfaces of a material which is a good conductor of heat maintaining constant heat absorbing relation of said solid with said surface and predetermining the rate of heat transfer to said solid by the thickness of said conducting material.

12. A method of distributing the refrigerant values of solid carbon dioxide in a desired region to be refrigerated thereby, which method includes absorbing heat by said solid by maintaining it in firm heat conducting contact with one portion of a surface of a relatively large area metallic member; absorbing heat from the atmosphere or material in said region to be refrigerated, through portions of the surface of said metallic member located in said region; transferring heat thus absorbed to said contact surface, through an all metal path, and predetermining the rate of said transfer for desired approximation of constant temperature for said heat absorbing portions by predetermining the heat-flow section and the resulting conducting capacity of the metal constituting said all-metal path.

13. The method which includes refrigerating for moderate temperatures, by gradual evaporation of an initial supply of solidified carbon dioxide, by absorbing heat from the atmosphere or material to be refrigerated, at a level above said solid through a surface of a material which is a good conductor of heat, and applying such heat to said solid by maintaining close heat absorbing relation of said solidified carbon dioxide with another, more remote, lower level surface of said conducting material, the heat absorbing area of said conducting material being much greater than the area of close heat absorbing relation to said solid and the temperature of the remote portions of said material being rendered uniform within desired limits by predetermined thickness for said materials.

14. Refrigerating apparatus, including a relatively large-area metallic element or plate, having some portions of its surface in heat absorbing relation to a region or material to be cooled and having solidified carbon dioxide in conductive heat exchange relation with other portions of the surface more remote from said heat-absorbing portions, the thickness of said metallic element being predetermined to maintain approximately constant temperature for the more remote portions.

15. Refrigerating apparatus, including an insulating container having therein a metallic element or plate of good conducting metal, solidified carbon dioxide in close heat exchange relation with a relatively small area of the metal, the thickness of the metal being predetermined to maintain the metal at desired approximations of constant temperatures for desired distances from said solidified carbon dioxide.

16. A refrigerator and refrigerating means therein including container means of storage capacity and heat insulation suitable for refrigerating at moderate temperatures for long periods by means of cakes of frozen carbon dioxide absorbing heat from and venting its refrigerant gas into the atmosphere of said refrigerator; said container means having large-area heat absorbing surfaces as compared with its capacity, in conducting relation between the solid and the atmosphere in the refrigerator, the heat absorbing walls of the container including an inner surface which is of good heat conducting material upon which the solid carbon dioxide rests and maintains intimate contact by gravity as it melts, and a permanent outer protecting layer of slowly conducting insulating material whereby said inner layer is maintained at approximately constant temperature so long as any substantial amount of the solid carbon dioxide remains in the container.

17. In a refrigerating system, means containing cakes of frozen carbon dioxide, said means including a sufficient extent of insulation to preserve said cakes of frozen carbon dioxide for the extended refrigeration desired and to prevent over-refrigeration of the products to be refrigerated, and an inner sheet metal element to afford a conducting path from remote points to the frozen carbon dioxide, and means permitting escape of the gas from the solid carbon dioxide for use both as a refrigerant and as a preservative by utilizing the escaping gas to prevent deterioration of perishable products.

18. In a refrigerating system, the combination of a chamber to be refrigerated, a container of cakes of frozen carbon dioxide within the chamber, said container being formed of or including substantial insulating means, the capacity and insulation of the containers being proportioned to the total capacity and contents of the chamber to be refrigerated so as to effect the required amount of refrigeration by latent heat absorption and by the escaping carbon dioxide gas attendant upon and resulting from the evaporation of the frozen carbon dioxide within said container and said container including a thin, inner container member of good conducting material within said insulation, adapted to conduct heat to said frozen carbon dioxide, for the purpose described.

19. Refrigerating apparatus, including an insulating container having an interior layer of good conducting metal, solidified carbon dioxide in contact with a relatively small area of the bare metal, the thickness of the metal being predetermined to maintain said interior at a desired approximation of constant temperature for a desired distance from the surface of contact of said solidified carbon dioxide.

20. A metal container and solid carbon dioxide within and protected by said metal container and by heat insulating material, said container being practically gas tight except for a high level overflow outlet; whereby heavy cold gas evolved from the solid operates to drive out the upper, warmer, less-pure part of the atmosphere within the container, for the purpose and with the result that in continued operation the solid is completely submerged in the purest part of the gas.

Signed, at Glendale, in the county of Los Angeles, and State of California, this 6th day of February, A. D. 1931.

THOMAS B. SLATE.